United States Patent
Tarchala et al.

(10) Patent No.: US 11,845,322 B2
(45) Date of Patent: Dec. 19, 2023

(54) CONVEYING VEHICLE-RELATED INFORMATION USING THERMAL TOUCH AND HAPTICS

(71) Applicant: Honda Motor Co., Ltd., Tokyo (JP)

(72) Inventors: Christopher John Tarchala, Torrance, CA (US); Hanna Gee, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 17/342,766

(22) Filed: Jun. 9, 2021

(65) Prior Publication Data
US 2022/0396121 A1    Dec. 15, 2022

(51) Int. Cl.
*B60H 1/00* (2006.01)
*G06F 3/0488* (2022.01)
(Continued)

(52) U.S. Cl.
CPC ..... *B60H 1/00742* (2013.01); *B60H 1/00985* (2013.01); *B60K 35/00* (2013.01);
(Continued)

(58) Field of Classification Search
CPC ............ B60H 1/00742; B60H 1/00985; B60H 1/00657; B60K 35/00; B60K 2370/1442; B60K 2370/158; B60K 2370/48; B60K 2370/55; B60K 2370/566; G06F 3/016; G06F 3/0488; G06F 1/1626; G06F 1/163; G06F 1/1656; G06F 1/206; G06F 3/011
See application file for complete search history.

(56) References Cited

U.S. PATENT DOCUMENTS 8,868,292 B2    10/2014   Park et al.
9,589,455 B2 *  3/2017    Nakagawa .............. B60L 53/51
(Continued)

FOREIGN PATENT DOCUMENTS

CN    204229265 U    3/2015
CN    107933245 A    4/2018
(Continued)

*Primary Examiner* — Frantz F Jules
*Assistant Examiner* — Matthew John Moscola
(74) *Attorney, Agent, or Firm* — Aaron Fong; American Honda Motor Co., Inc.

(57) ABSTRACT

A portable display apparatus for conveying vehicle-related information using thermal and haptic touch is provided. The portable display apparatus includes circuitry communicatively coupled to a temperature control unit of the portable display apparatus. The circuitry receives from one or more first sensors associated with a vehicle, first temperature information associated with an interior space of the vehicle or an ambient environment of the vehicle and determines a temperature setting based on received first temperature information. The circuitry detects a physical-contact between the portable display apparatus and one of a skin portion or a cloth portion worn by a user. Thereafter, the circuitry controls the temperature control unit based on the determined temperature setting and the detected physical-contact. The temperature control unit is controlled to change a current temperature of at least a first section of the portable display apparatus to a first temperature, which is different from the current temperature.

19 Claims, 7 Drawing Sheets

(51) Int. Cl.
  *B60K 35/00* (2006.01)
  *G06F 3/01* (2006.01)
(52) U.S. Cl.
  CPC ............ *G06F 3/016* (2013.01); *G06F 3/0488* (2013.01); *B60K 2370/1442* (2019.05); *B60K 2370/158* (2019.05); *B60K 2370/48* (2019.05)

(56) References Cited

U.S. PATENT DOCUMENTS

| | | | |
|---|---|---|---|
| 10,843,524 B2 | 11/2020 | Li | |
| 2015/0053370 A1* | 2/2015 | Kikuchi | B60H 1/00778 |
| | | | 165/11.1 |
| 2016/0154578 A1 | 6/2016 | Luo et al. | |
| 2017/0084137 A1* | 3/2017 | Coish | G08B 6/00 |
| 2017/0312614 A1* | 11/2017 | Tran | G06F 3/00 |
| 2017/0355382 A1 | 12/2017 | Wang et al. | |
| 2018/0144232 A1* | 5/2018 | DeBates | G06Q 10/087 |
| 2018/0148008 A1* | 5/2018 | Gage | B60H 1/00778 |
| 2018/0222391 A1 | 8/2018 | Chen | |
| 2020/0192532 A1* | 6/2020 | Van Wiemeersch | B60K 37/02 |
| 2021/0245577 A1* | 8/2021 | Miyakoshi | F25B 41/24 |
| 2022/0185111 A1* | 6/2022 | Biswal | H04R 1/08 |

FOREIGN PATENT DOCUMENTS

| | | |
|---|---|---|
| CN | 108372765 A | 8/2018 |
| CN | 105437913 B | 2/2019 |
| CN | 211352931 U | 8/2020 |
| CN | 111993856 A | 11/2020 |
| DE | 4227658 C1 | 9/1993 |
| KR | 20150075788 A | 7/2015 |
| WO | 2012028343 A1 | 3/2012 |

* cited by examiner

CONVEYING VEHICLE-RELATED INFORMATION USING THERMAL TOUCH AND HAPTICS

BACKGROUND

Advancements in automobile technology have led to development of various devices and techniques that utilize information from vehicle sensors to convey vehicle related information to user. Most of such devices and techniques may be limited to controls such as temperature adjustments, key-based immobilization, infotainment, navigation, and driving assistance. While such devices and techniques may help to enhance the user experience inside the vehicle, they may not necessarily help to convey accurate vehicle-related information to users who may be outside of the vehicle or who may not have access to such controls inside the vehicle.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a portable display apparatus for conveying vehicle-related information using thermal and haptic touch is provided. The portable display apparatus may include circuitry communicatively coupled to a temperature control unit of the portable display apparatus. From one or more first sensors associated with a vehicle, the circuitry may receive first temperature information associated with an interior space of the vehicle or an ambient environment of the vehicle. The circuitry may determine a temperature setting based on received first temperature information. Thereafter, the circuitry may detect a physical-contact between the portable display apparatus and one of a skin portion or a cloth portion worn by a user. The circuitry may control the temperature control unit based on the determined temperature setting and the detected physical-contact. The temperature control unit may be controlled to change a current temperature of at least a first section of the portable display apparatus to a first temperature, which may be different from the current temperature.

According to another embodiment of the disclosure, a method associated with a portable display apparatus that includes a temperature control unit is provided. The method may include receiving, from one or more first sensors associated with a vehicle, first temperature information associated with an interior space of the vehicle or an ambient environment of the vehicle. The method may further include determining a temperature setting based on received first temperature information and detecting a physical-contact between the portable display apparatus and one of a skin portion or a cloth portion worn by a user. The method may further include controlling the temperature control unit based on the determined temperature setting and the detected physical-contact. The temperature control unit may be controlled to change a current temperature of at least a first section of the portable display apparatus to a first temperature, which is different from the current temperature.

DETAILED DESCRIPTION

Figure 1:
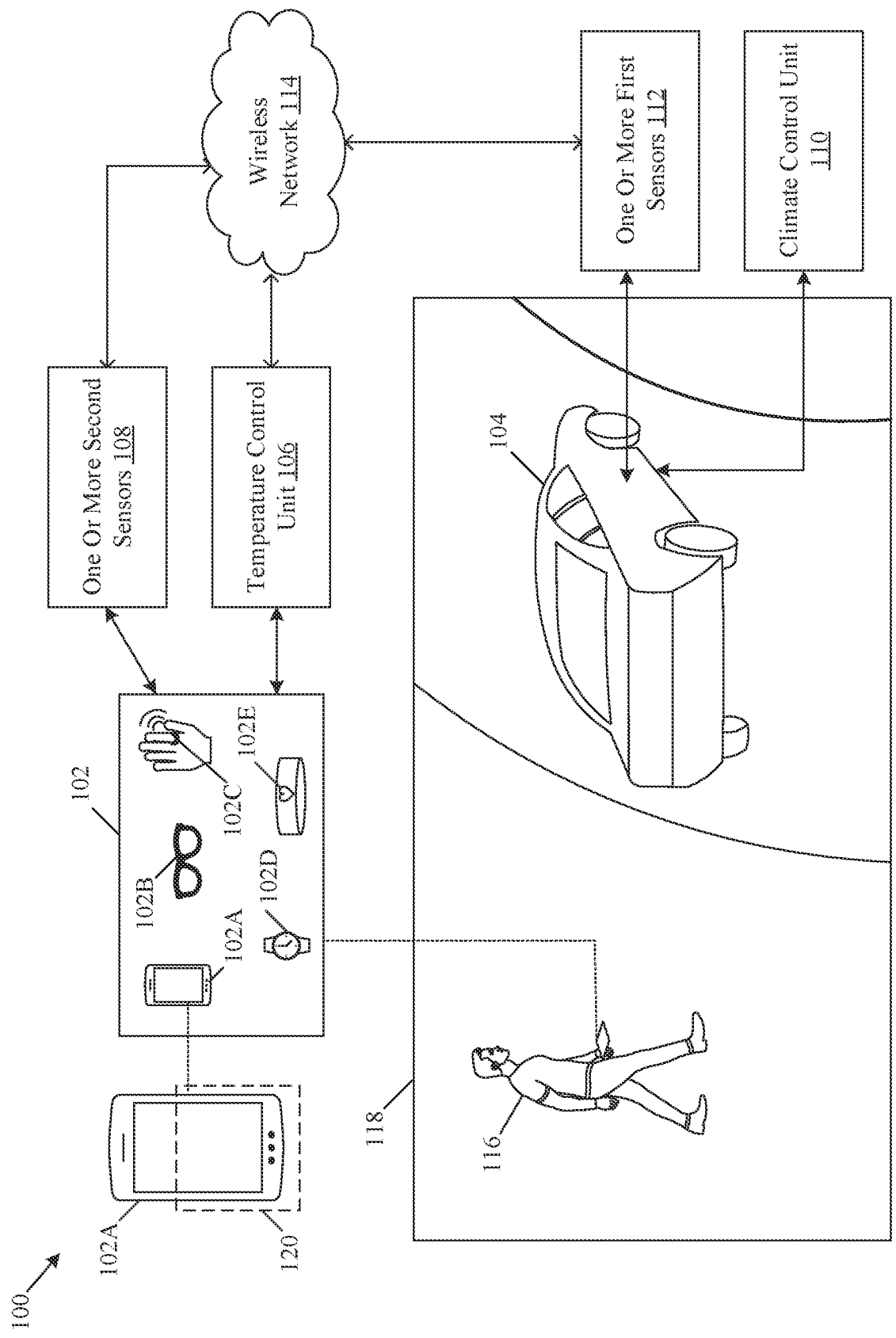
FIG. 1 is a block diagram that illustrates an exemplary environment for conveying vehicle-related information using thermal touch and haptics, in accordance with an embodiment of the disclosure.

Various embodiments of the present disclosure may be found in a portable display apparatus (for example, a smartphone, a smartwatch, a head-mounted display, and the like) which may convey vehicle-related information optimally using thermal touch and haptics to a user. From one or more first sensors (such as a temperature sensor) associated with a vehicle, the portable display apparatus may receive temperature information (such as a current temperature) associated with an interior space (such as passenger compartment) of the vehicle or an ambient environment of the vehicle. The portable display apparatus may determine a temperature setting (such as a warm setting or a cold setting) based on the received temperature information.

At any time-instant, the portable display apparatus may detect a physical-contact between the portable display apparatus and one of a skin portion or a cloth portion worn by the user. Thereafter, the portable display apparatus may control the temperature control unit based on the determined temperature setting and the detected physical-contact. The temperature control unit may be controlled to change a current temperature of at least a first section (such as a first section which have the physical-contact with the at least one of the skin portion or the cloth portion worn by the user) of the portable display apparatus to a temperature which may be different from the current temperature.

The disclosed portable display apparatus may control the temperature control unit to suitably adjust a current temperature of the portable display apparatus based on detected contact and the temperature setting. For example, the portable display apparatus may control the temperature control unit to increase the current temperature of the portable display apparatus, if the temperature associated with the interior space of the vehicle or the ambient environment of the vehicle is above a threshold (for a hot weather). Similarly, if the temperature associated with the interior space of the vehicle or the ambient environment of the vehicle is below a threshold (for a cold weather), the portable display apparatus may control the temperature control unit to decrease the current temperature of the portable display apparatus.

The change (increase or decrease) in the current temperature may produce a thermal sensation (i.e. a form of somatic sensation), which may convey a current state of the vehicle in terms of a static or dynamic temperature variation in the interior space of the vehicle or in the ambient environment of the vehicle. The thermal sensations may allow the user to sense how hot or cold the interior (such as the passenger compartment) of the vehicle or the ambient environment is with respect to a reference temperature.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary environment for conveying vehicle-related information using thermal touch and haptics, in accordance with an embodiment of the disclosure. With reference to FIG. 1, there is shown a block diagram of a network environment 100. The network environment 100 may include a portable display apparatus 102 and a vehicle 104. The portable display apparatus 102 may include a temperature control unit 106 and one or more second sensors 108. The vehicle 104 may include a climate control unit 110 and one or more first sensors 112, which may be integrated into or externally placed around the vehicle 104. The portable display apparatus 102 and components, such as the climate control unit 110 and the one or more first sensors 112 of the vehicle 104 may be communicatively coupled via a wireless network 114. There is further shown a user 116 who may be associated with the portable display apparatus 102.

The portable display apparatus 102 may include suitable logic, circuitry, code, and/or interfaces that may be configured to control devices integrated into the portable display apparatus 102 to generate sensations (such as somatic and kinaesthetic sensations) which convey vehicle-related information to the user 116. By way of example, and not limitation, devices such as the temperature control unit 106 or a haptic feedback device (not shown) may be controlled to generate a thermal and haptic feedback based on temperature information associated with an interior space of the vehicle 104 or an ambient environment 118 of the vehicle 104. The ambient environment 118 may refer to any type of physical space in immediate surroundings of the vehicle 104. For example, ambient environment 118 may correspond to a road, an alley, a parking space, or any area where the vehicle 104 can be parked or driven.

Examples of the portable display apparatus 102 may include, but are not limited to, a smartphone (such as a smartphone 102A), a mobile phone, a tablet, a laptop, a gaming device, an eXtended Reality (XR) devices (such as a Virtual Reality (VR) device, an Augmented Reality (AR) device, or a Mixed Reality (MR) device), a wearable sensor, a wearable haptic device, a wearable computer (such as smart glasses 102B, a smartwatch 102D, and a smart band or activity tracker). Example implementations of the wearable sensor may include, but are not limited to, a ring-type wearable sensor 102C, a belt-type wearable sensor, a vest with embedded sensors, a waist strap with embedded sensors, a wrist strap with embedded sensors 102E, an instrumented wearable belt, a wearable garment with embedded sensors and display, or a wearable article-of-manufacture having a retrofitting of sensors and display.

The portable display apparatus 102 in FIG. 1 is presented merely as an example and should not be construed as limiting for the disclosure. The present disclosure may be applicable to other types of portable display apparatus, without departing from the scope of the disclosure.

The vehicle 104 may be an autonomous, a semi-autonomous, or a non-autonomous vehicle, as defined, for example, by Society of Automotive Engineers (SAE) automation levels. Examples of the vehicle 104 may include, but are not limited to, an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The vehicle 104 in FIG. 1 is merely shown as an example and such an example should not be construed as limiting for the disclosure. The present disclosure may be applicable to other types of vehicles such as, but not limited to, a two-wheeler vehicle, a three-wheeler vehicle, a vehicle with more than four wheels, an aero plane, a flying vehicle, or a water-borne vehicle. A description of other types of vehicles has been omitted from the disclosure for the sake of brevity.

The temperature control unit 106 may include suitable logic, circuitry, code, and/or interfaces that may be configured to control temperature of the portable display apparatus 102. For example, the temperature control unit 106 may be configured to change a current temperature of at least a first section (such as a section 120) of the portable display apparatus 102 (such as the smartphone 102A). Examples of the temperature control unit 106 may include, but are not limited to, a powering system (such as power supply circuit or a battery/charge controller) of the portable display apparatus 102, an electronically-controlled heat exchanger device, an electronically-controlled heat pump, an electronically-controlled active or passive cooling device, or an audio reproduction device (such as a thermoacoustic cooling device). The temperature control unit 106 may be included in or integrated into the portable display apparatus 102.

The one or more second sensors 108 associated with the portable display apparatus 102 may include suitable logic, circuitry, code, and/or interfaces that may be configured to detect a first section (such as the section 120) of the portable display apparatus 102, which may be in a physical-contact with one of a skin portion or a cloth portion worn by the user 116. The one or more second sensors 108 may be configured to determine a current temperature of at least the first section of the portable display apparatus 102. Examples of the one or more second sensors 108 may include, but are not limited to, a temperature sensor, a proximity sensor, an accelerometer, a gyroscope, a location sensor, an image sensor, a touch sensor, and a touchscreen. The one or more second sensors 108 may be included in or integrated into the portable display apparatus 102.

The climate control unit 110 may include suitable logic, circuitry, interfaces, and/or code that may be configured to control a current temperature of the vehicle 104. The climate control unit 110 may be further configured to change the current temperature of the vehicle 104 based on a user input via the portable display apparatus 102 or via an electronic user interface integrated into the vehicle 104. Examples of the climate control unit 110 may include, but are not limited to, an Electronic Control Unit (ECU) associated with HVAC system, an automatic climate control (ACS) device, and a heating, ventilation, and air conditioning (HVAC) system. In an embodiment, the climate control unit 110 may be a part of the HVAC/ACS system of the vehicle 104.

The one or more first sensors 112 may include suitable logic, circuitry, code, and/or interfaces that may be configured to determine first temperature information associated with the interior space of the vehicle 104 or the ambient environment 118 of the vehicle 104. In an embodiment, the one or more first sensors 112 may be further configured to determine airflow information associated with the HVAC/ACS system of the vehicle 104. The airflow information may include, for example, a volumetric flow, an airflow rate, a direction of airflow inside the vehicle 104, and the like. The one or more first sensors 112 may be further configured to transmit the determined first temperature information (and the airflow information) to the portable display apparatus 102. Examples of the one or more first sensors 112 may include, but are not limited to, a temperature sensor, a proximity sensor, a location sensor, an infrared sensor, an airflow sensor, or a combination thereof.

The wireless network 114 may include a medium through which two or more wireless nodes may communicate with each other. For example, the wireless network 114 may include a medium through which the portable display apparatus 102, the vehicle 104, and other devices may communicate with each other. The wireless network 114 may be established in accordance with Institute of Electricals and Electronics Engineers (IEEE) standards for infrastructure mode (Basic Service Set (BSS) configurations), or in some specific cases, in ad hoc mode (Independent Basic Service Set (IBSS) configurations).

The wireless network 114 may be a Wireless Sensor Network (WSN), a Mobile Wireless Sensor Network (MWSN), a wireless ad hoc network, a Mobile Ad-hoc Network (MANET), a Wireless Mesh Network (WMN), a Wide Area Network (WAN), a Wireless Local Area Network (WLAN), a cellular network, a Vehicle-to-Everything (V2X) network (such as a Cellular V2X), Dedicated Short-Range Communication (DSRC) Wireless Access in Vehicular Environment (Wave) network, a Long Term Evolution (LTE) network, or an Evolved High Speed Packet Access (HSPA+), and the like. The wireless network 114 may operate in accordance with IEEE standards, such as 802 wireless standards or a modified protocol, which may include, but are not limited to, 802.3, 802.15.1, 802.16 (Wireless local loop), 802.20 (Mobile Broadband Wireless Access (MBWA)), 802.11-1997 (legacy version), 802.15.4, 802.11a, 802.11b, 802.11g, 802.11e, 802.11i, 802.11f, 802.11c, 802.11h (specific to European regulations) 802.11n, 802.11j (specific to Japanese regulations), 802.11p, 802.11ac, 802.11ad, 802.11ah, 802.11aj, 802.11ax, 802.11 ay, 802.11az, 802.11 hr (high data rate), 802.11af (white space spectrum), 802.11-2007, 802.11-2008, 802.11-2012, 802.11-2016.

In an embodiment, for any pair of wireless devices, the wireless network 114 may be established to use a specific type of communication, such as a short-range communication or a long-range communication. The short-range communication may be a point-to-point communication, a point-to-point line-of-sight (LOS) communication, or a point-to-multipoint communication. Examples of protocols for the short-range communication may include, but are not limited to, Radio Frequency Identification (RFID), Wireless USB, Dedicated Short Range Communications (DSRC), and Near Field Communication (NFC) (e.g., NFC Peer-to-Peer), Bluetooth, or Bluetooth Low Energy (BLE). Other examples of protocols for communication may include, but are not limited to, ZigBee, Personal Area Network (PAN), Wi-Max, Wireless Metropolitan Area Networks (WMAN), and Local Multipoint Distribution Service.

In operation, the portable display apparatus 102 may be configured to receive a user input, for example, to turn-on the portable display apparatus 102 or to activate a monitoring mode in which the portable display apparatus 102 may monitor changes in temperature or airflow inside the vehicle 104 or in an ambient surrounding of the vehicle 104. At any time-instant, the portable display apparatus 102 may be configured to receive first temperature information associated with an interior space (for example, a passenger compartment) of the vehicle 104 and/or the ambient environment 118 of the vehicle 104. The first temperature information may be received from the one or more first sensors 112 associated with the vehicle 104.

In an embodiment, the one or more first sensors 112 may be integrated into the vehicle 104. In another embodiment, the one or more first sensors 112 be installed in an environment which may be ambient to the vehicle 104. By way of example, and not limitation, if the vehicle 104 is determined to be in a parked state at a parking space, then sensors (for example, wireless or contact-based temperature sensors) installed at one or more locations in the parking space may determine the first temperature information associated with at least one of the passenger compartment of the vehicle 104, an external temperature of the body of the vehicle 104, or an ambient temperature around the vehicle 104. The first temperature information may be timeseries data in the form of a series of temperatures values (absolute or relative with respect to a reference temperature) which correspond to a set of time-intervals or time-instants. In an embodiment, the first temperature information may include a current temperature of the interior space of the vehicle 104 and/or the ambient environment 118 of the vehicle 104.

The portable display apparatus 102 may be configured to determine a temperature setting based on the received first temperature information. The temperature setting may include one or more parameters, which may control the temperature of at least the first section (such as the section 120) of the portable display apparatus 102. By way of example, and not limitation, the temperature setting may include a first parameter which includes a value of a first temperature that may need to be set for the portable display apparatus 102, a second parameter which includes a rate at which a current temperature of the portable display apparatus 102 is to be changed to the first temperature, and a third parameter which includes a first duration in which the current temperature is to be changed to the first temperature. The determination of the temperature setting is described, for example in, FIGS. 3A and 3B.

Figure 3A:
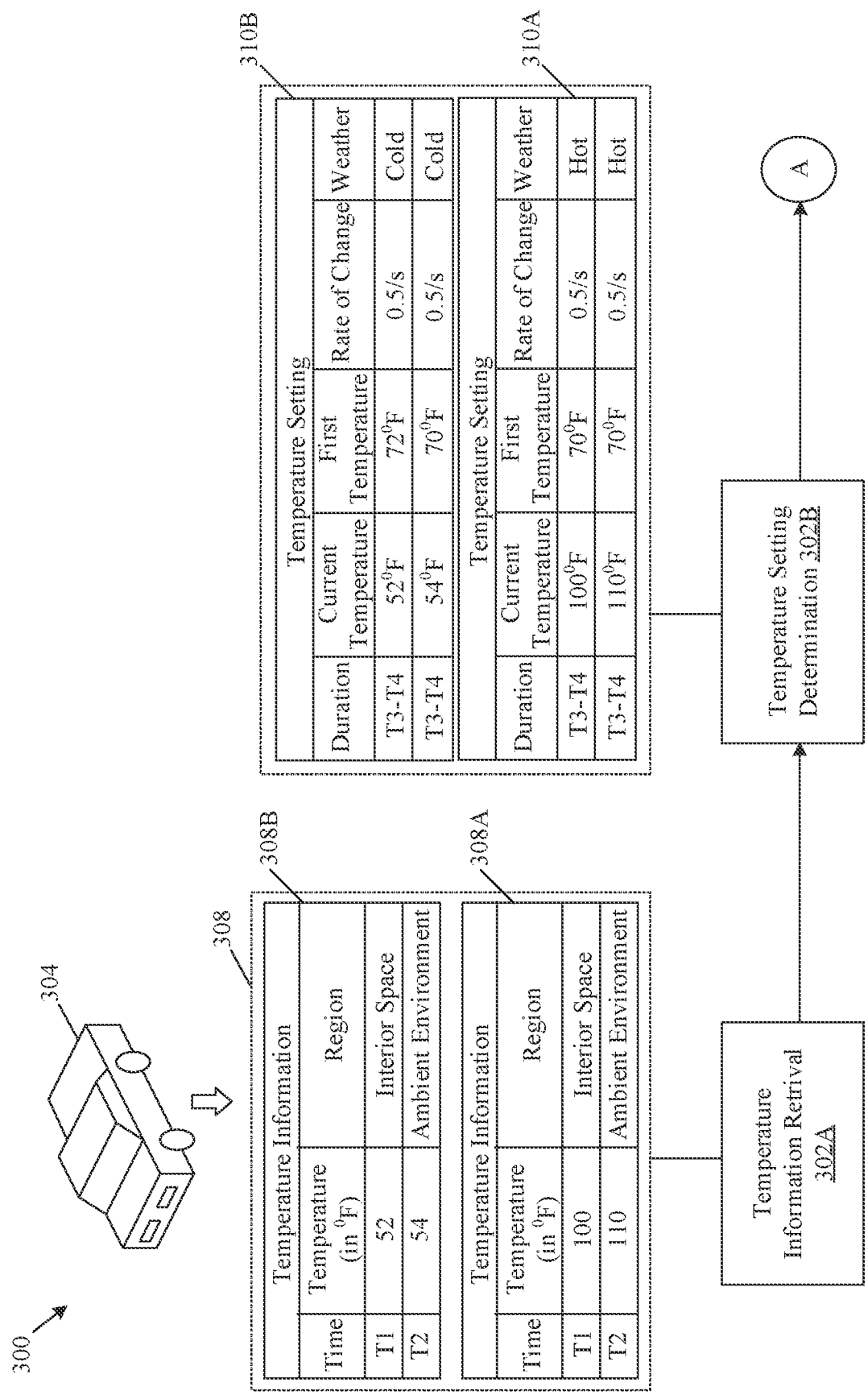
FIGS. 3A and 3B collectively illustrate an exemplary scenario for conveying vehicle-related information in hot and cold weather conditions, in accordance with an embodiment of the disclosure.
Figure 3B:
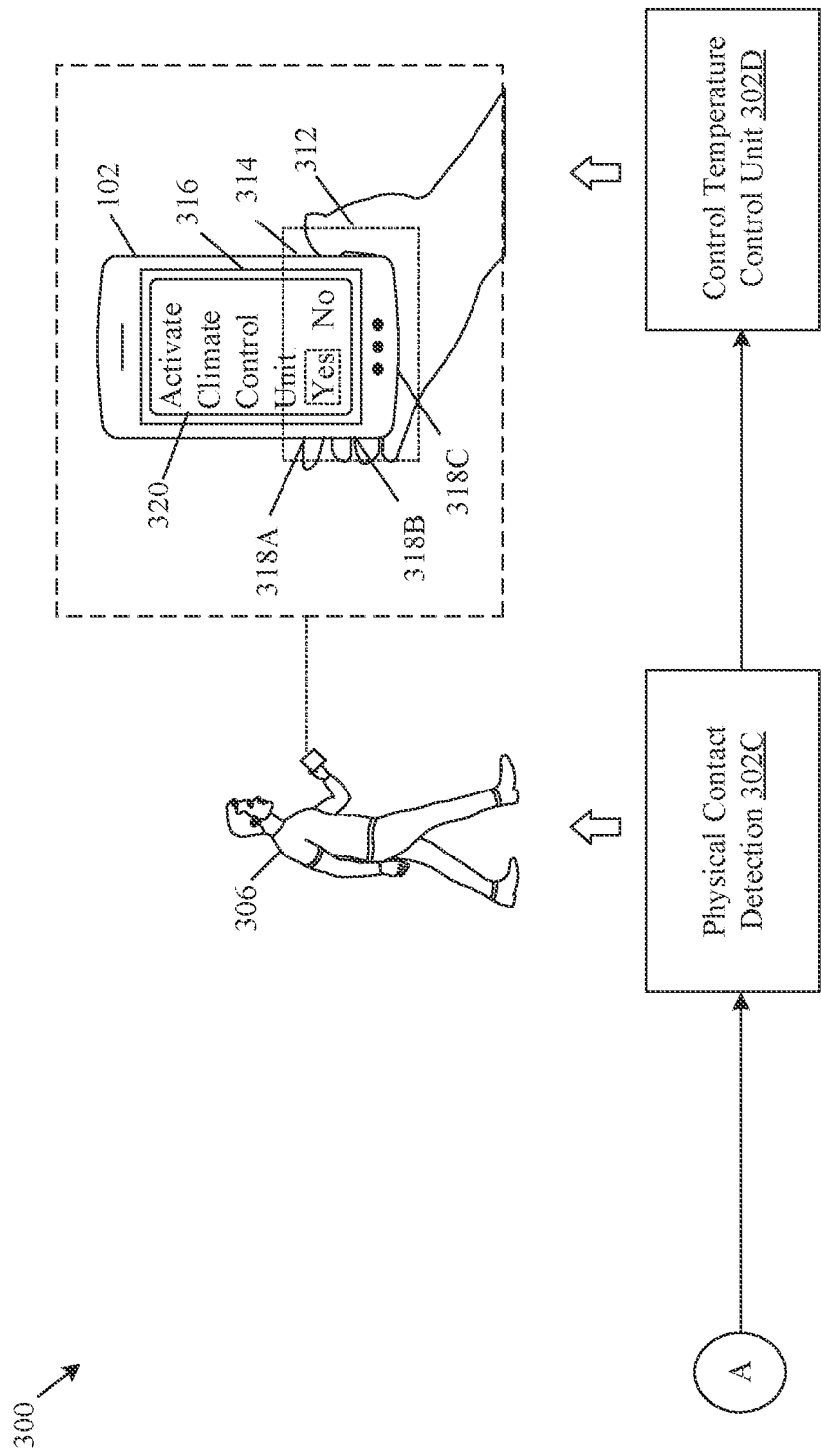

The portable display apparatus 102 may be further configured to detect a physical contact between the portable display apparatus 102 and one of a skin portion or a cloth portion worn by the user 116, as described, for example in, FIGS. 3A and 3B. The detection of a physical contact may correspond to a state, such as but not limited to, a handheld state in which the portable display apparatus 102 is held in hand, a worn state in which the portable display apparatus 102 is worn on a body portion (for example, head, face, hand, neck, finger, arm, and the like), or a stored state in which the portable display apparatus is stored inside in a receptable (such as a pocket or a bag).

The portable display apparatus 102 may be further configured to control the temperature control unit 106 based on the determined temperature setting and the detected physical contact. The temperature control unit 106 may be controlled to change a current temperature of at least the first section (such as the section 120) of the portable display apparatus 102 to a first temperature, which may be different from the current temperature. Examples of the first section may include, but are not limited to, a front panel of the portable display apparatus 102, a back panel of the portable display apparatus 102, a display area of the portable display apparatus 102, and one or more touch points (such as a virtual or physical button or a fingerprint sensor) on the portable display apparatus 102. The control of the temperature control unit 106 is described, for example in, FIGS. 3A and 3B. The change in the current temperature to the first temperature may produce a thermal sensation (i.e. a form of somatic sensation), which may convey a current state of the vehicle 104 in terms of a static or dynamic temperature variation in the interior space of the vehicle 104 or in the ambient environment 118 of the vehicle 104.

The thermal sensations may allow the user 116 to sense how hot or cold the interior (such as the passenger compartment) of the vehicle 104 or the ambient environment 118 is with respect to a reference temperature. The reference temperature may be, for example, a normal room temperature, a normal body temperature, a user-specified temperature, or a current temperature related to one or more location-specific factors (such as a climate or weather condition or an indoor temperature inside the user' residing or dwelling location)). As an example, if the user 116 is sensitive to temperature below 50 degrees Fahrenheit (i.e. 10 degrees Celsius), then 50 degrees may be set as the reference temperature. If the temperature of the interior space of the vehicle 104 or in the ambient environment 118 drops below 50 degrees, then a thermal sensation may be produced using the portable display apparatus 102 as a feedback associated with the current state of the vehicle 104 (which may be parked outside, for example). While the temperature setting may enable the portable display apparatus 102 to dynamically control the temperature control unit 106 to produce a desired thermal sensation, the detection of a physical contact with skin or cloth may enable the portable display apparatus 102 to selectively activate or deactivate the control of the temperature control unit 106.

Figure 2:
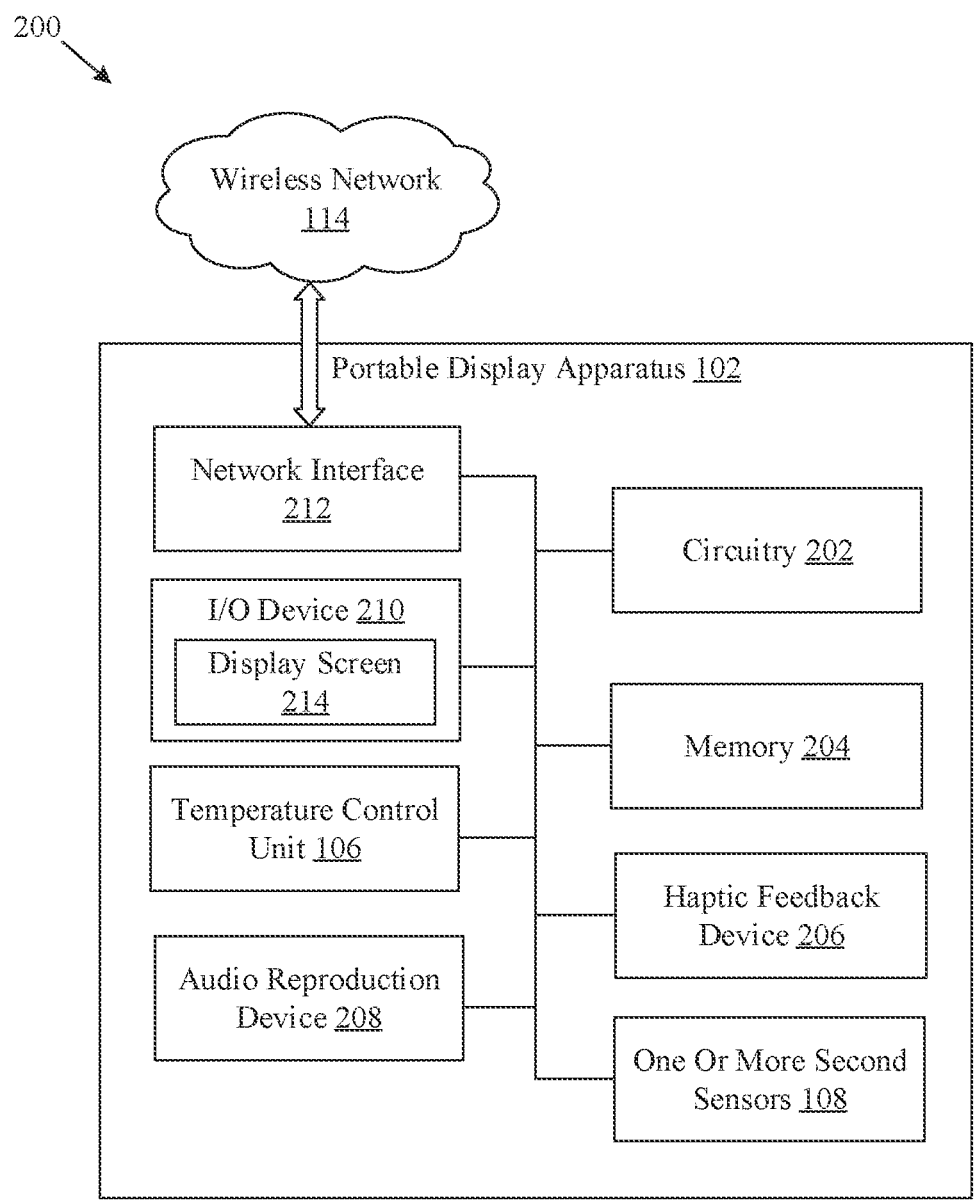
FIG. 2 is a block diagram that illustrates an exemplary portable display apparatus for conveying vehicle-related information using thermal touch and haptics, in accordance with an embodiment of the disclosure.

FIG. 2 is a block diagram that illustrates an exemplary portable display apparatus for conveying vehicle-related information using thermal touch and haptics, in accordance with an embodiment of the disclosure. FIG. 2 is explained in conjunction with elements from FIG. 1. With reference to FIG. 2, there is shown a block diagram 200 of the portable display apparatus 102. The portable display apparatus 102 may include circuitry 202, memory 204, an input/output (I/O) device 210, a haptic feedback device 206, an audio reproduction device 208, and a network interface 212. The I/O device 210 may further include a display screen 214. The network interface 212 may connect the portable display apparatus 102 with the vehicle 104, via the wireless network 114.

The circuitry 202 may include suitable logic, circuitry, and/or interfaces that may be configured to execute program instructions associated with different operations to be executed by the portable display apparatus 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store one or more of, but not limited to, information associated with the received first temperature information, the determined temperature setting, received speed information associated with one or more fans of the activated climate control unit 110, and received airflow information associated with the interior space of the vehicle 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The haptic feedback device 206 may include suitable logic, circuitry, code, and/or interfaces that may be configured to generate a haptic feedback based on the received speed information associated with one or more fans of the climate control unit 110. The haptic feedback device 206 may be integrated into the portable display apparatus 102. Examples of the haptic feedback device 206 may include, but are not limited to, a vibration motor, an Eccentric Rotating Mass (ERM) vibration motor, and a linear resonant actuator.

The audio reproduction device 208 may include suitable logic, circuitry, code, and/or interfaces that may be configured to reproduce audio content (for example, a test tone or an audio tone). The audio reproduction device 208 may be configured to receive electrical signals or instructions (i.e. related to the audio) from the one or more first sensors 112 to play of the audio indicative of a sound that gush of air makes from vents of the climate control unit 110 of the vehicle 104. The audio reproduction device 208 may convert the received electrical signals or instructions into the audio output for the reproduction of the audio. In some embodiments, the audio reproduction device 208 may be integrated into the portable display apparatus 102. Alternatively, the audio reproduction device 208 may be an external component separate from the portable display apparatus 102. Examples of the audio reproduction device 208 may include, but are not limited to, an internal speaker, a woofer, a sub-woofer, a tweeter, a loudspeaker, a monitor speaker, an optical audio device, or sound output device.

The I/O device 210 may include suitable logic, circuitry, interfaces, and/or code that may be configured to receive an input and provide an output based on the received input. The I/O device 210 may include various input and output devices, which may be configured to communicate with the circuitry 202. For example, the portable display apparatus 102 may receive (via the I/O device 210) the user input from the user 116 to activate the climate control unit 110 of the vehicle 104. Examples of the I/O device 210 may include, but are not limited to, a touch screen, a keyboard, a mouse, a joystick, a display device (for example, the display screen 214), a microphone, or a speaker (for example an audio reproduction device 208). In some embodiments, the user input (such as hearing information of the user 116) may be received through the I/O device 210.

The display screen 214 may comprise suitable logic, circuitry, and interfaces that may be configured to display an output of the portable display apparatus 102. The display screen 214 may be utilized to render information about the first temperature information. In some embodiments, the display screen 214 may be an external display device associated with the portable display apparatus 102. The display screen 214 may be a touch screen which may enable the user 116 to provide a user input via the display screen 214. The touch screen may be at least one of a resistive touch screen, a capacitive touch screen, a thermal touch screen or any other touch screen using which inputs can be provided to the display screen 214 or the circuitry 202. The display screen 214 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 214 may refer to a display screen of a head mounted device (HMD), a smart-glass device, a see-through display, a projection-based display, an electro-chromic display, or a transparent display.

The network interface 212 may comprise suitable logic, circuitry, interfaces, and/or code that may be configured to facilitate communication between the portable display apparatus 102 and the one or more first sensors 112 of the vehicle 104, via the wireless network 114. The network interface 212 may be implemented by use of various known technologies to support wired or wireless communication of the portable display apparatus 102 with the wireless network 114. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 212 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The operations of the circuitry 202 are described, for example, in FIGS. 3A, 3B 4, 5, and 6. It should be noted that the portable display apparatus 102 in FIG. 2 may include various other components or systems. The description of the other components or systems of the portable display apparatus 102 has been omitted from the disclosure for the sake of brevity.

FIGS. 3A and 3B collectively illustrate an exemplary scenario for conveying vehicle-related information in hot and cold weather conditions, in accordance with an embodiment of the disclosure. FIGS. 3A and 3B are explained in conjunction with elements from FIGS. 1 and 2. With reference to FIGS. 3A and 3B, there is shown an exemplary scenario 300 which depicts a portable display apparatus 102 and a vehicle 304. There is further shown a user 306 associated with the portable display apparatus 102. The portable display apparatus 102 and the vehicle 304 may be exemplary implementations of the portable display apparatus 102 and the vehicle 104, respectively.

At 302A, temperature information may be received. In an embodiment, the portable display apparatus 102 may be configured to receive first temperature information associated with an interior space of the vehicle 304 or an ambient environment (such as the ambient environment 118) of the vehicle 304. The first temperature information may be received from one or more first sensors (such as the one or more first sensors 112) associated with the vehicle 304. Additionally, or alternatively, the first temperature information may be received from a data source other than the one or more sensors associated with the vehicle 304. The data source may include, for example, a persistent storage on the vehicle 304, a cloud server, and the like.

The first temperature information may be indicative of a current temperature of the interior space of the vehicle 304 or the ambient environment 118 of the vehicle 304. As shown, for example, first temperature information 308 may be received by the portable display apparatus 102. In an embodiment, the first temperature information 308 may include a time-instant at which a temperature value is measured, the temperature value (in degree Fahrenheit) corresponding to the time-instant, and an identifier or a categorical variable which associates the temperature value with a location, such as the interior space of the vehicle 304 or the ambient environment around the vehicle 304. By way of example, and not limitation, first temperature information 308A may include data points, such as a first data point associated with a time (T1) and a second data point associated with a time (T2). The data point associated with time (T1) may include the temperature value as 100° F. associated with the interior space of the vehicle 304. Similarly, the data point associated with time (T2) may include the temperature value 110° F. associated with the ambient environment 118 of the vehicle 304. By way of another example, and not limitation, first temperature information 308B may include data points, such as a first data point associated with a time (T1) and a second data point associated with a time (T2). The data point associated with time (T1) may include the temperature value as 52° F. associated with the interior space of the vehicle 304. Similarly, the data point associated with time (T2) may include the temperature value 54° F. associated with the ambient environment 118 of the vehicle 304.

At 302B, a temperature setting may be determined. In an embodiment, the portable display apparatus 102 may be configured to determine the temperature setting based on the received first temperature information. In an embodiment, the portable display apparatus 102 may be configured to receive a current temperature of at least a first section (such as the section 312) of the portable display apparatus 102. For example, if the portable display apparatus 102 is a smartphone or a wearable device, the current temperature may be associated with a back panel, a battery pack, or a front screen of the smartphone or the wearable device. The current temperature may be received from the one or more second sensors 108 associated with the portable display apparatus 102. Thereafter, the portable display apparatus 102 may compare the received temperature information (such as the temperature values included in the first temperature information) with the received current temperature of at least the first section of the portable display apparatus 102. Based on the comparison, the portable display apparatus 102 may determine the temperature setting. For example, based on the comparison, it may be possible to determine whether the current temperature of the interior space or the ambient environment is suitable for the user 306 or not in relation to the current weather condition (which may be cold, for example).

In most weather conditions, it may be assumed that the current temperature of the portable display apparatus 102 may remain close to but still different from the temperature inside the vehicle 304 or outside (in the ambient environment) the vehicle 304. The difference in both temperatures may be due to a location or objects which may be proximal to or in contact with the portable display apparatus 102. For example, the portable display apparatus 102 may be held in hand or may be stored inside a receptacle (such as a pocket or a bag).

In an embodiment, the temperature setting may include a first parameter which may include a value of a first temperature to be set for the portable display apparatus 102 and a second parameter which may include a rate at which a current temperature of the portable display apparatus 102 may have to be changed to the first temperature. While the first parameter may control an extent of feedback through thermal sensations (i.e., the first temperature of a section of the portable display apparatus (in contact with the skin or cloth of the user 306)), the second parameter may control the speed at which the section of the portable display apparatus 102 may heat up or cool down to reach the first temperature.

In some embodiments, based on the weather condition, the parameters (such as the first parameter) may be set to a value that may be slightly above or below the current temperature of the first section of the portable display apparatus 102. An embodiment for determination of temperature setting for a hot weather condition is described herein. The portable display apparatus 102 may determine a temperature value included in the received first temperature information to be above a first threshold, for example, 100 degrees Fahrenheit. The portable display apparatus 102 may also determine the current temperature of at least the first section (such as the section 312) of the portable display apparatus 102 to be below the first threshold. In such a case, the portable display apparatus 102 may set a value of the first temperature so that the set value is below the determined temperature value and above the current temperature of at least the first section of the portable display apparatus 102. Thereafter, the temperature setting may be determined by updating the first parameter of the temperature setting with the set value of the first temperature.

By way of example, and not limitation, in hot weather conditions, it is common for vehicles (which may be parked outside or may be in operation at daytime) to reach higher temperatures than a standard reference. While the temperature value (for example, 120 degrees Fahrenheit) of the interior space or the ambient environment of the vehicle 304 may be above a threshold of 100 degrees Fahrenheit, the current temperature (for example, 86 degrees Fahrenheit) of the first section of the portable display apparatus 102 may be below the first threshold of 100 degrees Fahrenheit. In such a case, the value of the first temperature (of the temperature setting) may be set to a value which may be above 86 degrees Fahrenheit and below 120 degrees Fahrenheit.

As shown, for example, based on the first temperature information 308A, a temperature setting 310A may be determined by the portable display apparatus 102. The temperature setting 310A may include information, for example, a time-period for which temperature is changed, a value of the current temperature (in degree Fahrenheit), a value the first temperature, a rate at which the temperature is changed from the current temperature to the first temperature, and the weather condition. For example, the temperature setting 310A may include two data points for a first duration (such as from time T3 to T4). The first datapoint may be associated with the interior space of the vehicle 304 and may include a value of the current temperature as 100° F., a value of the first temperature as 70° F., a rate of change 0.5° F./sec, and a weather condition as hot weather. Similarly, the second data point may be associated with associated with the ambient environment 118 of the vehicle 304 and may include a value of the current temperature as 110° F., a value of the first temperature as 70° F., a rate of change as 0.5° F./sec, and weather condition as hot weather.

An embodiment for determination of temperature setting for cold weather condition is described herein. The portable display apparatus 102 may determine a temperature value included in the received temperature information to be below a second threshold, for example, 50 degrees Fahrenheit. The portable display apparatus 102 may also determine the current temperature of at least the first section (such as the section 312) of the portable display apparatus 102 to be above the first threshold. In such a case, the portable display apparatus 102 may set a value of the first temperature so that the set value is above the determined temperature value and below the current temperature of at least the first section of the portable display apparatus 102. Thereafter, the temperature setting may be determined by updating the first parameter of the temperature setting with the set value of the first temperature.

By way of example, and not limitation, in cold weather conditions, it is common for vehicles (which may be parked outside or may be in operation at daytime or nighttime) to reach lower temperatures than a standard reference. While the temperature value (for example, 30 degrees Fahrenheit) of the interior space or the ambient environment of the vehicle 304 may be below a threshold of 50 degrees Fahrenheit, the current temperature (for example, 70 degrees Fahrenheit) of the first section of the portable display apparatus 102 may be above the first threshold of 50 degrees Fahrenheit. In such a case, the value of the first temperature (of the temperature setting) may be set to a value that may be below 70 degrees Fahrenheit but above 30 degrees Fahrenheit.

As shown, for example, based on the first temperature information 308B, a temperature setting 310B may be determined by the portable display apparatus 102. The temperature setting 310B may include information, for example, a time-period for which temperature is changed, a value of the current temperature (in degree Fahrenheit), a value the first temperature, a rate at which the temperature is changed from the current temperature to the first temperature, and the weather condition. For example, the temperature setting 310B may include two data points for a first duration (such as from time T3 to T4). The first datapoint may be associated with the interior space of the vehicle 304 and may include a value of the current temperature as 52° F., a value of the first temperature as 72° F., a rate of change as 0.5° F./sec, and weather condition as cold weather. Similarly, the second datapoint may be associated with the ambient environment 118 of the vehicle 304 and may include a value of the current temperature as 54° F., a value of the first temperature as 70° F., a rate of change as 0.5° F./sec, and weather condition as cold weather.

At 302C, a physical-contact may be detected. In an embodiment, the portable display apparatus 102 may be configured to detect a physical-contact between the portable display apparatus 102 and one of a skin portion or a cloth portion worn by the user 306. In an embodiment, the portable display apparatus 102 may detect the physical-contact based on one or more signals received from one or more second sensors (such as the one or more second sensors 108) associated with the portable display apparatus 102. The one or more signals may be indicative of the physical-contact between the portable display apparatus 102 and one of a skin portion of the user 306 or a cloth portion worn by the user 306. As an example, the portable display apparatus 102 may include a plurality of touch sensors integrated into a body 314 of the portable display apparatus 102. The plurality of touch sensors may receive pressure signals indicative of touch spots 318A, 318B, and 318C on the body 314. Activation of such touch spots may be used to detect whether or not the portable display apparatus 102 is in a physical-contact with the skin portion of the user 306. As another example, the portable display apparatus 102 may process gyroscope data, accelerometer data, image data, proximity sensor data, and/or other sensor-based data to detect whether or not the portable display apparatus 102 is in a physical-contact with the skin portion or the cloth portion of the user 306.

At 302D, the temperature control unit 106 may be controlled. In an embodiment, the portable display apparatus 102 may be configured to control the temperature control unit 106 based on the determined temperature setting and the detected physical-contact. The temperature control unit 106 may be controlled to change the current temperature of at least a first section 312 of the portable display apparatus 102 to the first temperature, which may be different from the current temperature of the first section 312.

In an embodiment, the change may correspond to an increase in temperature from the current temperature to the first temperature. For example, as the weather outside may be hot and the current temperature in the interior space or in the ambient environment may be above 100 degrees Fahrenheit, parameter(s) such as the first temperature may be set so that the current temperature of the portable display apparatus 102 increases by few degrees (for example, 4-5 degrees) to produce thermal sensations (which reflect that the vehicle 304 is probably too hot and needs to be cooled down). The first temperature may still remain below the current temperature of the interior space or the ambient environment. This may be done to avoid overheating in the portable display apparatus 102, which may be uncomfortable for the user.

To cause an increase in the temperature, the temperature control unit 106 may include one or more of a heating element, a powering system of the portable display apparatus, an electronically-controlled heat exchanger device, or an electronically-controlled heat pump, for example. As an example, the powering system of the portable display apparatus 102 may be controlled to increase the temperature of the portable display apparatus 102. As another example, the electronically-controlled heat exchanger device may accumulate heat through a fluid inside the portable display apparatus 102 to increase the temperature of the first section 312 of the portable display apparatus 102. As another example, the electronically-controlled heat pump may use a fan, a heat pipe, and/or a heatsink to accumulate heat at the first section 312 of the portable display apparatus 102 so as to increase the temperature of the first section 312.

In an embodiment, the change may correspond to a decrease in temperature from the current temperature to the first temperature. For example, the weather outside may be cold and the current temperature in the interior space or in the ambient environment may be below 50 degrees Fahrenheit. If the current temperature of the portable display apparatus 102 is around 70 degrees Fahrenheit, then the parameters may be set so that the current temperature of the portable display apparatus 102 is reduced further by few degrees (for example, 4-5 degrees) to produce thermal sensations (which reflect that the vehicle is probably too cold and needs to be heated up). The first temperature may still remain above the current temperature of the interior space or the ambient environment. This may be done to avoid overcooling in the portable display apparatus 102, which may be uncomfortable for the user.

To cause a decrease in the temperature, the temperature control unit 106 may include one or more of an electronically-controlled active or passive cooling device, an electronically-controlled heat exchanger device, an electronically-controlled heat pump, or an audio-reproduction device (uses thermoacoustic cooling), for example. As an example, a thermoacoustic cooling setup may be included with the audio reproduction device (such as speakers). The speaker may be controlled to play audio tones. Over a period, the playback of such tones in the thermoacoustic cooling setup may cause the temperature of the first section 312 to decrease by few degree Fahrenheits.

In an embodiment, the portable display apparatus 102 may be configured to control a display unit (such as the display screen 316) of the portable display apparatus 102 to display an electronic User Interface (UI) 320. The electronic UI 320 may be accessed through a web client or a software application pre-installed on the portable display apparatus 102. Through the electronic UI 320, the portable display apparatus 102 may receive a first user input which includes a selection of an activation option on the electronic UI 320. Based on the received first user input, the portable display apparatus 102 may activate a climate control unit (such as the climate control unit 110) of the vehicle 304 remotely. As shown in FIG. 3B, the first user input may be 'Yes' and may be received to activate the climate control unit 110. The one or more first sensors 112 may acquire the first temperature information for a first duration before and/or after the climate control unit 110 is activated. The activation of the climate control unit 110 is further discussed in detail for example, in FIG. 4.

Figure 4:
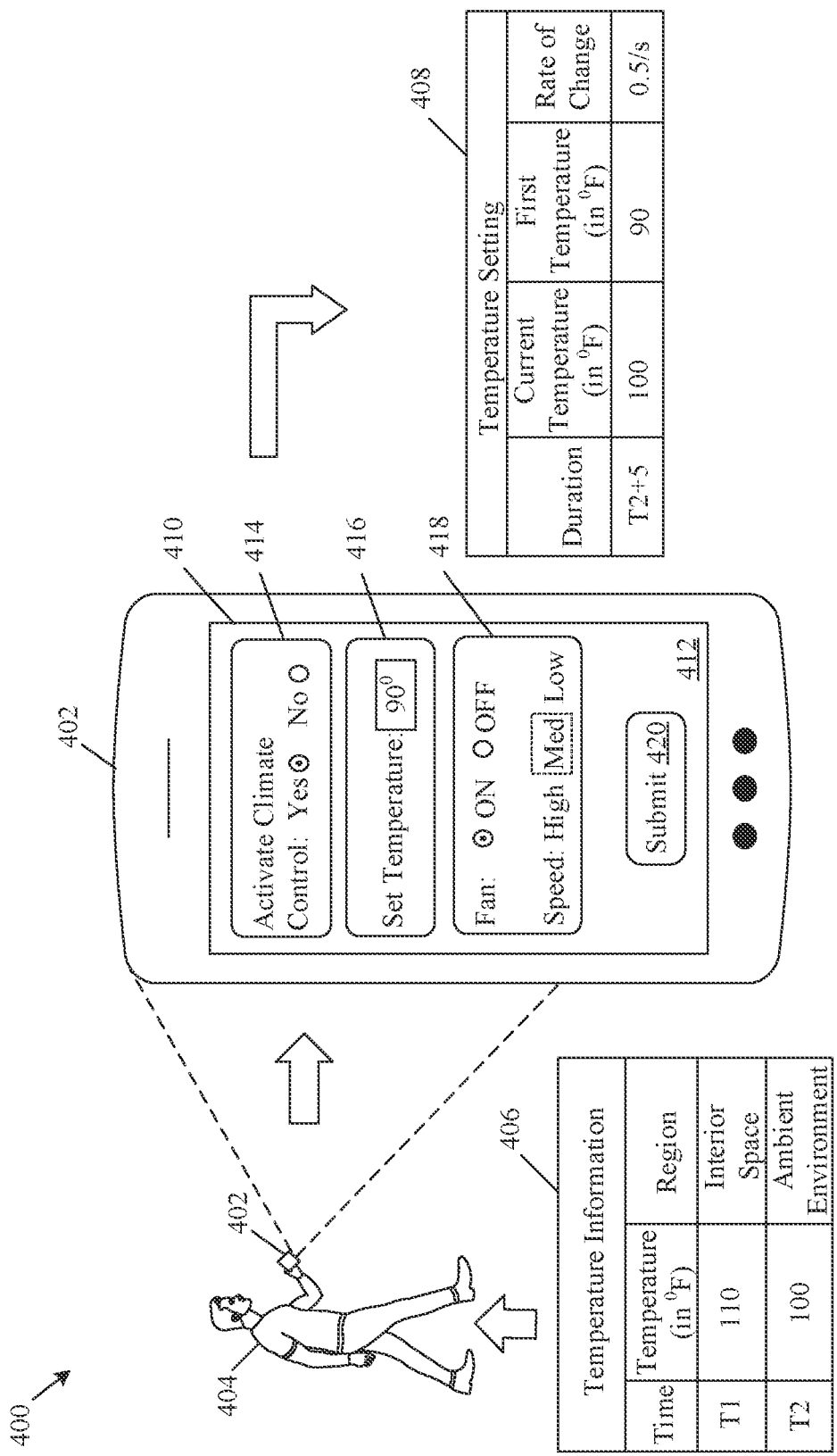
FIG. 4 illustrates an exemplary scenario for conveying vehicle-related information using thermal touch and haptics, in accordance with an embodiment of the disclosure.

FIG. 4 is a diagram that illustrates an exemplary scenario for conveying vehicle-related information using thermal touch and haptics, in accordance with an embodiment of the disclosure. FIG. 4 is explained in conjunction with elements from FIGS. 1, 2, 3A and 3B. With reference to FIG. 4, there is shown an exemplary scenario 400 which depicts a portable display apparatus 402. There is further shown a user 404 associated with portable display apparatus 402. The portable display apparatus 402 may be an exemplary implementation of the portable display apparatus 102 of FIG. 1.

At any time-instant, the portable display apparatus 402 may be configured to receive from one or more first sensors (such as the one or more first sensors 112) associated with a vehicle (such as the vehicle 304), first temperature information associated with an interior space of the vehicle 304 or an ambient environment (such as the ambient environment 118) of the vehicle 304, as described in for example, in FIGS. 3A and 3B. An example of first temperature information 406 is shown. The first temperature information 406 includes two data points, such as a first data point at time (T1) that may include a value of the temperature (such as 110° F.) associated with the interior space of the vehicle 304 and a second data point at time (T2) that may include a value of the temperature (such as 100° F.) associated with the ambient environment 118 of the vehicle 304.

The portable display apparatus 402 may be configured to determine a temperature setting based on the received first temperature information, as described for example, in FIGS. 3A and 3B. As shown, for example, based on the first temperature information 406, a temperature setting 408 may be determined by the portable display apparatus 402. For example, the temperature setting 408 may include a data entry for a first duration (such as from time T2+5 seconds), associated with the interior space of the vehicle 304 including a value of the current temperature (such as 90° F.), a value of the first temperature (such as 70° F.), a rate of change (such as 0.5° F./sec).

The portable display apparatus 402 may be configured to detect a physical-contact between the portable display apparatus 402 and one of a skin portion or a cloth portion worn by the user 404, as described, for example, in FIGS. 3A and 3B. Thereafter, the portable display apparatus 402 may be configured to control the temperature control unit 106 based on the determined temperature setting and the detected physical-contact. The temperature control unit 106 may be controlled to change the current temperature of at least a first section (such as the first section 312) of the portable display apparatus 402 to the first temperature, which may be different from the current temperature of the first section 312. The change may correspond to an increase or a decrease in the current temperature.

As the user 404 may experience thermal sensations caused by the change in temperature, the user 404 may want to remotely activate a climate control unit (such as the climate control unit 110) of the vehicle 304. One or more embodiments for remote activation of the climate control unit are described herein. In an embodiment, the portable display apparatus 402 may be configured to control a display unit (such as the display screen 410) of the portable display apparatus 402 to display an electronic User Interface (UI). Through the electronic UI, the portable display apparatus 402 may receive a first user input that includes a selection of an activation option on the electronic UI. Based on the received first user input, the portable display apparatus 402 may activate a climate control unit (such as the climate control unit 110) of the vehicle 304 remotely. The one or more first sensors 112 may acquire the first temperature information for a first duration before or after the climate control unit 110 is activated. For example, at time T2, the portable display apparatus 402 may receive the first temperature information when the climate control unit 110 is inactive. At time (T2+5 seconds), the portable display apparatus 402 may receive the first temperature information when the climate control unit 110 is activated.

As shown in FIG. 4, an electronic UI 412 may be displayed on the portable display apparatus 402. On the electronic UI 412, there is shown a first UI element 414, a second UI element 416, a third UI element 418, and a fourth UI element 420 through which an input may be received from the user 404. The first UI element 414 may correspond to a radio button and may be configured to receive a first user input via the I/O device 210. The first user input may be indicative of the activation of the climate control unit 110 of the vehicle 304. The second UI element 416 may correspond to, for example, a text box that may be configured to receive a value of a temperature associated with the first temperature. The third UI element 418 may correspond to a radio button. The third UI element 418 may be configured to receive a user input via the I/O device 210. The user input may be indicative of the activation of one or more fans of the vehicle 304 and a speed of the fans. The fourth UI element 420 may be, for example, a button that may be configured to submit the user input(s) (e.g., the first user input) through the electronic UI 412.

In an embodiment, the portable display apparatus 402 may be configured to receive, via the electronic UI, a second user input which includes at least one of a schedule or temperature thresholds for hot and cold weather. The climate control unit 110 of the vehicle 304 may be remotely activated further based on the received second input. The temperature thresholds may include, for example, a temperature of 10° F., 15° F., 20° F., 30° F., and the like. As an example, the user 404 may set a temperature threshold for the hot and cold weather as 25° F. If the current temperature (specified in the first temperature information) is above a temperature threshold, then the climate control unit 110 may be remotely activated in order to decrease the temperature inside the vehicle 304. Whereas, if the current temperature (specified in the first temperature information) is below the temperature threshold, then the climate control unit 110 may be remotely activated in order to increase the temperature inside the vehicle 304. As another example, the user 404 may set a schedule for hot weather to cool the vehicle 304 from 8:00 AM-8:15 AM and 5:00 PM-5:15 PM every day for 3 months (such as May to July). Based on the schedule, the climate control unit 110 may be remotely activated to decrease the temperature of the vehicle 304. As another example, the user 404 may set a schedule for cold weather to heat the vehicle 304 from 8:00 AM-8:15 AM and 5:00 PM-5:15 PM, every day for 3 months (such as November to January). Based on the schedule, the climate control unit 110 may be remotely activated to increase the temperature of the vehicle 304.

The disclosed portable display apparatus may dynamically control the climate control unit 110 associated with the vehicle 304 based on at least one of the schedule or temperature thresholds for hot and cold weather. Such controls and UI-based activation may enhance the user experience with the vehicle 104.

In an embodiment, the portable display apparatus 102 may be further configured to receive real-time information which includes one or more of a current time, a geo-location of the vehicle 304, or a weather forecast for the geo-location. The climate control unit 110 of the vehicle 304 may be remotely activated further based on the received real-time information. In an embodiment, the real-time information may be received from the one or more second sensors 108. For example, the climate control unit 110 may be remotely activated based on a current time of a day, such as a morning time, an evening time, or a nighttime. The portable display apparatus 402 may determine the temperature setting based on the current time of day and the climate control unit 110 may be remotely activated based on the temperature information associated with the current time of the day. As another example, the climate control unit 110 may be remotely activated based on a geo-location of the vehicle 304. The geo-location may correspond to a location type, such as a beach, a hill-station, a residential area, or a parking lot. In another example, the climate control unit 110 may be remotely activated based on a weather forecast for the geo-location. The weather forecast for the geo-location may be, for example, a hot weather, a cold weather, a snowy day, a rainy day, and the like. The portable display apparatus 402 may determine the temperature setting based on the weather forecast for the geo-location and the climate control unit 110 may be remotely activated based on the temperature information associated with the weather forecast for the geo-location.

In an embodiment, after the activation of the climate control unit 110, the portable display apparatus 402 may be configured to receive air flow information associated with the interior space of the vehicle 304. The airflow information may include, for example, a rate of flow or a speed of flow of air through HVAC vents of the vehicle 304. In an embodiment, the portable display apparatus 402 may be configured to receive the air flow information from the one or more first sensors 112. For example, the one or more first sensors 112 may include an air flow sensor which may record the volume flow (in cubic feet per minute) and the rate of flow or the speed of flow of air through HVAC vents of the vehicle 304. The air flow sensor may transmit a signal to the portable display apparatus 402 to indicate the volume flow and the speed of the air flow from vents of the climate control unit 110 of the vehicle 304. The portable display apparatus 402 may be configured to detect the air flow information associated with the interior space of the vehicle 304 based on the received signal from the air flow sensor. As an example, the portable display apparatus 402 may receive the air flow information associated with the interior space of the vehicle 304 as 60 cubic feet per minute. The portable display apparatus 402 may be configured to control an audio reproduction device (such as the audio reproduction device 208) integrated into the portable display apparatus 402 to play an audio based on the received air flow information. The audio may be played to reproduce a sound that a gush of air makes from vents of the climate control unit 110 of the vehicle 304.

In an embodiment, the portable display apparatus 402 may be configured to receive speed information associated with one or more fans (not shown) of the activated climate control unit 110. In an embodiment, the portable display apparatus 402 may be configured to receive from the one or more first sensors 112, the speed information associated with the one or more fans of the activated climate control unit 110. For example, the one or more first sensors 112 may include a speed sensor or an airflow sensor to detect the speed information associated with the one or more fans of the activated climate control unit 110. The speed sensor may transmit a signal to the portable display apparatus 402 to indicate speed of the one or more fans of the activated climate control unit 110. Based on the signal, the portable display apparatus 402 may be configured to determine the speed information associated with the one or more fans of the activated climate control unit 110. By way of example, and not limitation, the portable display apparatus 402 may receive the speed information associated with the one or more fans of the activated climate control unit 110 as a categorical value (for example, high, medium, or low speed) or a definite value (for example 1000 rotations per minute). The portable display apparatus 402 may be configured to control a haptic feedback device (such as the haptic feedback device 206) integrated into the portable display apparatus 402 to generate a haptic feedback based on the received speed information.

Figure 5:
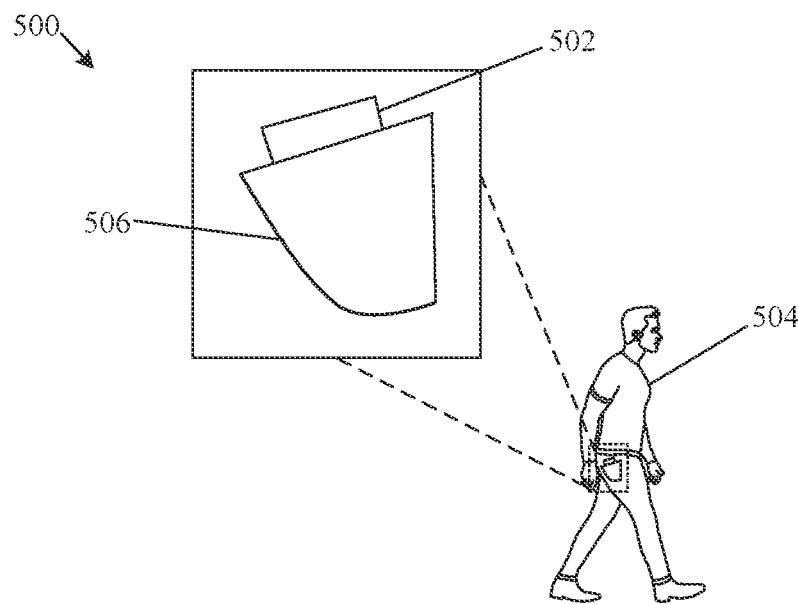
FIG. 5 illustrates an exemplary scenario for control of temperature control unit based on detection of a location of a portable display apparatus, in accordance with an embodiment of the disclosure.

FIG. 5 illustrates an exemplary scenario for control of temperature control unit based on detection of a location of a portable display apparatus, in accordance with an embodiment of the disclosure. FIG. 5 is explained in conjunction with elements from FIGS. 1, 2, 3A, 3B, and 4. With reference to FIG. 5, there is shown an exemplary scenario 500 which depicts a portable display apparatus 502 and a user 504 associated with portable display apparatus 502. The portable display apparatus 502 may be an exemplary implementation of the portable display apparatus 102 of FIG. 1.

In an embodiment, the circuitry 202 may be further configured to detect a containment 506 of the portable display apparatus 502 inside in a receptacle worn by the user 504. The temperature control unit 106 may be controlled based on the detected containment. In an embodiment, the portable display apparatus 502 may be configured to receive one or more signals which may be indicative of a position of the portable display apparatus 502. The one or more signals may be received from one or more second sensors (such as the one or more second sensors 108) associated with the portable display apparatus 502. As an example, the one or more second sensors 108 may include a proximity sensor, an image sensor, or an accelerometer to detect the containment 506 of the portable display apparatus 502. The proximity sensor may transmit a signal to indicate the position of the portable display apparatus 502. The portable display apparatus 502 may be configured to detect the containment 506 of the portable display apparatus 502 based on the received signal from the proximity sensor. Examples of the receptacle worn by the user 504, may include, but are not limited to, a wallet, a purse, a carry bag, or a pocket in an apparel.

As shown, in FIG. 5, the portable display apparatus 502 may detect the containment 506 of the portable display apparatus 502 inside in a pocket of a cloth worn by the user 504. Thereafter, the temperature control unit 106 may be controlled based on the detected containment. For example, upon detection of the containment, the portable display apparatus 502 activate the temperature control unit 106 to change the current temperature of the first section (such as the section 120) of the portable display apparatus 502. Additionally, or alternatively, the haptic feedback device 206 may be deactivated upon detection of the containment.

Figure 6:
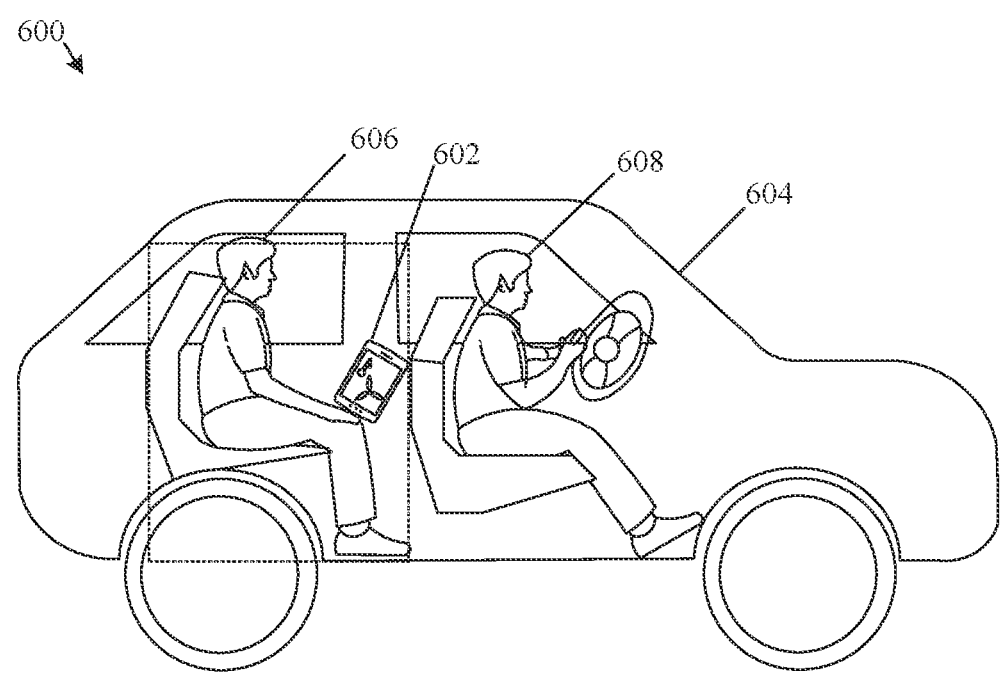
FIG. 6 illustrates an exemplary scenario for control of temperature control unit based on detection of a location of a portable display apparatus, in accordance with an embodiment of the disclosure.

FIG. 6 illustrates an exemplary scenario for control of temperature control unit based on detection of a location of a portable display apparatus, in accordance with an embodiment of the disclosure. FIG. 6 is explained in conjunction with elements from FIGS. 1, 2, 3A, 3B, 4, and 5. With reference to FIG. 6, there is shown an exemplary scenario 600 which depicts a portable display apparatus 602, and a vehicle 604. There is further shown a user 606 associated with portable display apparatus 602 and a driver 608 of the vehicle 604. The portable display apparatus 602 and the vehicle 604 may be exemplary implementations of the portable display apparatus 102 and the vehicle 104, respectively of FIG. 1.

At any time-instant, the circuitry 202 may be configured to detect a location of the portable display apparatus 602 to be within one of a rear passenger compartment or a front passenger compartment of the vehicle 604. In an embodiment, the portable display apparatus 602 may be configured to receive from one or more second sensors (such as the one or more second sensors 108) associated with the portable display apparatus 602, one or more signals indicative of a location of the portable display apparatus 602. For example, the one or more second sensors 108 may include an in-vehicle image sensor which may detect the location of the portable display apparatus 602. The location sensor may transmit a signal to indicate the location of the portable display apparatus 602 to be within the vehicle 604. The portable display apparatus 602 may be configured to detect the location of the portable display apparatus 602 based on the received signal.

As shown, in FIG. 6, the portable display apparatus 602 may detect a location of the portable display apparatus 602 as within the rear passenger compartment of the vehicle 604. Thereafter, the temperature control unit 106 may be controlled further based on the detected location. For example, upon detection, the portable display apparatus 602 may activate airflow through vents (of the climate control unit 110) which may be close to the rear passenger compartment (i.e. the detected location of the portable display apparatus 602). The activation of the airflow through the vents may be done so that the current temperature of the rear passenger compartment of the vehicle 604 changes. Whereas the current temperature of the front passenger compartment of the vehicle 604 associated with the driver 608 remain less affected. This may enable selective control of the climate control unit 110 based on the location of the portable display apparatus 602 within the vehicle 604.

Figure 7:
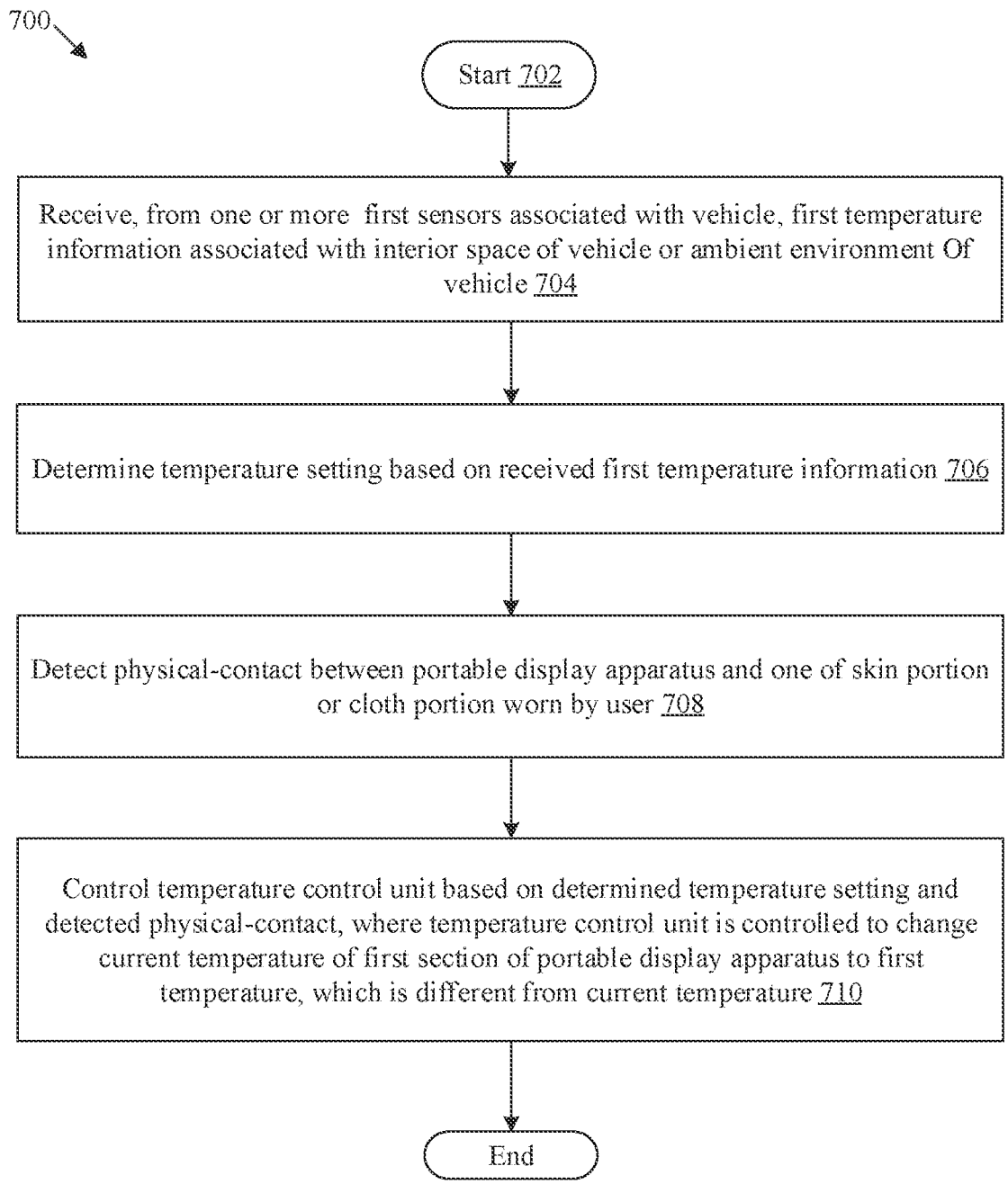
FIG. 7 is a flowchart that illustrates exemplary operations for conveying vehicle-related information using thermal touch and haptics, in accordance with an embodiment of the disclosure.

FIG. 7 is a flow chart that illustrates exemplary operations for conveying vehicle-related information using thermal touch and haptics, in accordance with an embodiment of the disclosure. With reference to FIG. 7, there is shown a flowchart 700. The flowchart 700 is described in conjunction with FIGS. 1, 2, 3A, 3B, 4, 5, and 6. The operations from 702 to 710 may be implemented by the portable display apparatus 102 shown in FIG. 1, or the circuitry 202 shown in FIG. 2. The operations of the flowchart 700 may start at 702 and proceed to 704.

At 704, first temperature information may be received. In an embodiment, the circuitry 202 may be configured to receive from one or more first sensors (such as the one or more first sensors 112) associated with a vehicle (such as the vehicle 104), the first temperature information associated with an interior space of the vehicle 104 or an ambient environment (such as the ambient environment 118) of the vehicle 104. The retrieval of the first temperature information is described, for example, in FIGS. 3A and 3B.

At 706, a temperature setting may be determined. In an embodiment, the circuitry 202 may be configured to determine the temperature setting based on received first temperature information. The determination of the temperature setting is described, for example, in FIGS. 3A and 3B.

At 708, a physical-contact may be detected. In an embodiment, the circuitry 202 may be configured to detect a physical-contact between the portable display apparatus 102 and one of a skin portion or a cloth portion worn by a user (such as the user 116). The detection of the physical-contact is described, for example, in FIGS. 3A and 3B.

At 710, a temperature control unit (such as the temperature control unit 106) may be controlled. In an embodiment, the circuitry 202 may be configured to control the temperature control unit 106 based on the determined temperature setting and the detected physical-contact. The temperature control unit 106 may be controlled to change a current temperature of at least a first section (such as the section 120) of the portable display apparatus 102 to a first temperature, which is different from the current temperature. The control of the temperature control unit 106 is described, for example, in FIGS. 3A and 3B. Control passes to end.

Although the flowchart 700 is illustrated as discrete operations, such as 704, 706, 708, and 710 the disclosure may not be so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium, and/or a non-transitory machine readable medium and/or storage medium stored thereon, a set of computer-executable instructions executable by a machine and/or a computer (such as, the portable display apparatus 102). The computer-executable set of instructions may be executable by the machine and/or the computer to perform the operations that may include reception, from one or more first sensors associated with a vehicle (e.g., the vehicle 104), first temperature information associated with an interior space of the vehicle or an ambient environment of the vehicle. The operations may further include determination of a temperature setting based on received first temperature information. The operations may further include detection a physical-contact between the portable display apparatus and one of a skin portion or a cloth portion worn by a user. The operations may further include control of a temperature control unit of the portable display apparatus, based on the determined temperature setting and the detected physical-contact. The temperature control unit may be controlled to change a current temperature of at least a first section of the portable display apparatus to a first temperature, which is different from the current temperature.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A portable display apparatus, comprising:
   circuitry communicatively coupled to a temperature control unit of the portable display apparatus, wherein the circuitry:
      receives, from one or more first sensors associated with a vehicle, temperature information associated with an interior space of the vehicle or an ambient environment of the vehicle;
      determines a temperature setting based on the received temperature information;
      detects a physical-contact between the portable display apparatus and one of a skin portion or a cloth portion worn by a user; and controls the temperature control unit based on the determined temperature setting and the detected physical-contact,
  wherein the temperature control unit is controlled to change a current temperature of at least a section of the portable display apparatus to a temperature, which is different from the current temperature;
  wherein the temperature setting comprises:
   a first parameter which comprises a value of the temperature;
   a second parameter which comprises a rate at which the current temperature changes to the temperature.

2. The portable display apparatus according to claim 1, wherein the circuitry further:
 controls a display unit of the portable display apparatus to display an electronic User Interface (UI);
 receives, via the electronic UI, a first user input comprising a selection of an activation option on the electronic UI; and
 activates a climate control unit of the vehicle remotely based on the received first input,
  wherein the one or more first sensors acquire the temperature information for a first duration before or after the climate control unit is activated.

3. The portable display apparatus according to claim 2, wherein the circuitry further:
 receives, via the electronic UI, a second user input comprising at least one of a schedule or temperature thresholds for hot and cold weather,
  wherein the climate control unit of the vehicle is remotely activated further based on the received second input.

4. The portable display apparatus according to claim 2, wherein the circuitry further:
 receives real-time information comprising one or more of a current time, a geo-location of the vehicle, or a weather forecast for the geo-location,
  wherein the climate control unit of the vehicle is remotely activated further based on the received real-time information.

5. The portable display apparatus according to claim 2, wherein the circuitry further:
 receives speed information associated with one or more fans of the activated climate control unit; and
 controls a haptic feedback device integrated into the portable display apparatus, to generate a haptic feedback based on the received speed information.

6. The portable display apparatus according to claim 2, wherein the circuitry further:
 receives, after the activation of the climate control unit, air flow information associated with the interior space of the vehicle; and
 controls, based on the received air flow information, an audio reproduction device integrated into the portable display apparatus to play an audio, wherein the audio is played to reproduce a sound that a gush of air makes from vents of the climate control unit of the vehicle.

7. The portable display apparatus according to claim 1, wherein the circuitry further:
 receives, from one or more second sensors associated with the portable display apparatus, the current temperature of at least the section of the portable display apparatus;
 compares the received temperature information with the received current temperature of at least the section of the portable display apparatus; and
 determines the temperature setting based on the comparison.

8. The portable display apparatus according to claim 1, wherein the circuitry further:
 determines a temperature value included in the received temperature information to be above a first threshold;
 determines the current temperature of at least the section of the portable display apparatus to be below the first threshold;
 sets a value of the temperature so that the set value is below the determined temperature value and above the current temperature of at least the section of the portable display apparatus; and
 determines the temperature setting by updating a first parameter of the temperature setting with the set value of the temperature.

9. The portable display apparatus according to claim 1, wherein the circuitry further:
 determines a temperature value included in the received temperature information to be below a second threshold;
 determines the current temperature of at least the section of the portable display apparatus to be above the second threshold;
 sets a value of the temperature so that the set value is above the determined temperature value and below the current temperature of at least the section of the portable display apparatus; and
 determines the temperature setting by updating a first parameter of the temperature setting with the set value of the temperature.

10. The portable display apparatus according to claim 1, wherein the change corresponds to an increase in temperature from the current temperature to the temperature, and wherein the temperature control unit comprises one or more of:
 a powering system of the portable display apparatus,
 an electronically-controlled heat exchanger device, or
 an electronically-controlled heat pump.

11. The portable display apparatus according to claim 1, wherein the change corresponds to a decrease in temperature from the current temperature to the temperature, and wherein the temperature control unit comprises one or more of:
 an electronically-controlled active or passive cooling device,
 an electronically-controlled heat exchanger device,
 an electronically-controlled heat pump, or
 an audio-reproduction device.

12. The portable display apparatus according to claim 1, wherein the circuitry further detects a location of the portable display apparatus to be within one of a rear passenger compartment or a front passenger compartment of the vehicle, and
 wherein the temperature control unit is controlled further based on the detected location.

13. The portable display apparatus according to claim 1, wherein the circuitry further detects a containment of the portable display apparatus inside in a receptacle worn by the user, and
 wherein the temperature control unit is controlled further based on the detected containment.

14. The portable display apparatus according to claim 1, wherein the section of the portable display apparatus comprises one or more of:
 a body of the portable display apparatus,
 a display screen of the portable display apparatus, a portion of the body which is detected to be in the physical-contact with the skin portion, or touch spots on the body which are detected to be in the physical-contact with the skin portion.

15. A method, comprising:

in a portable display apparatus comprising a temperature control unit:
receiving, from one or more first sensors associated with a vehicle, temperature information associated with an interior space of the vehicle or an ambient environment of the vehicle;
determining a temperature setting based on received temperature information;
detecting a physical-contact between the portable display apparatus and one of a skin portion or a cloth portion worn by a user; and
controlling the temperature control unit based on the determined temperature setting and the detected physical-contact,
wherein the temperature control unit is controlled to change a current temperature of at least a section of the portable display apparatus to a temperature, which is different from the current temperature;
wherein the temperature control unit is controlled to change a current temperature of at least a section of the portable display apparatus to a temperature, which is different from the current temperature
wherein the temperature setting comprises:
a first parameter which comprises a value of the temperature;
a second parameter which comprises a rate at which the current temperature changes to the temperature.

16. The method according to claim 15, further comprising controlling a display unit of the portable display apparatus to display an electronic User Interface (UI);
receiving, via the electronic UI, a first user input comprising a selection of an activation option on the electronic UI; and
activating a climate control unit of the vehicle remotely based on the received first input,
wherein the one or more first sensors acquire the temperature information for a first duration before or after the climate control unit is activated.

17. The method according to claim 16, further comprising receiving, via the electronic UI, a second user input comprising at least one of a schedule or temperature thresholds for hot and cold weather,
wherein the climate control unit of the vehicle is remotely activated further based on the received second input.

18. The method according to claim 16, further comprising:
receiving speed information associated with one or more fans of the activated climate control unit; and
controlling a haptic feedback device integrated into the portable display apparatus, generate a haptic feedback based on the received speed information.

19. A non-transitory computer-readable medium having stored thereon, computer-executable instructions that when executed by a portable display apparatus, causes the portable display apparatus to execute operations, the operations comprising:
receiving, from one or more first sensors associated with a vehicle, temperature information associated with an interior space of the vehicle or an ambient environment of the vehicle;
determining a temperature setting based on received temperature information;
detecting a physical-contact between the portable display apparatus and one of a skin portion or a cloth portion worn by a user; and
controlling a temperature control unit of the portable display apparatus, based on the determined temperature setting and the detected physical-contact,
wherein the temperature control unit is controlled to change a current temperature of at least a section of the portable display apparatus to a temperature, which is different from the current temperature;
wherein the temperature setting comprises:
a first parameter which comprises a value of the temperature;
a second parameter which comprises a rate at which the current temperature changes to the temperature.

* * * * *